United States Patent
Kondo et al.

(10) Patent No.: US 11,949,322 B2
(45) Date of Patent: Apr. 2, 2024

(54) POWER CONVERSION DEVICE

(71) Applicant: TOSHIBA MITSUBISHI-ELECTRIC INDUSTRIAL SYSTEMS CORPORATION, Chuo-ku (JP)

(72) Inventors: Kenichi Kondo, Chuo-kuJP (JP); Ryota Okuyama, Chuo-ku (JP); Takashi Sugiyama, Chuo-ku (JP)

(73) Assignee: TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 201 days.

(21) Appl. No.: 17/769,429

(22) PCT Filed: Sep. 18, 2020

(86) PCT No.: PCT/JP2020/035472
§ 371 (c)(1),
(2) Date: Apr. 15, 2022

(87) PCT Pub. No.: WO2022/059169
PCT Pub. Date: Mar. 24, 2022

(65) Prior Publication Data
US 2023/0299656 A1    Sep. 21, 2023

(51) Int. Cl.
*H02M 1/00*    (2006.01)
*H02M 1/084*    (2006.01)
(Continued)

(52) U.S. Cl.
CPC ......... *H02M 1/007* (2021.05); *H02M 1/0025* (2021.05); *H02M 1/084* (2013.01);
(Continued)

(58) Field of Classification Search
CPC ...... H02M 1/007; H02M 1/084; H02M 7/483; H02M 7/53871
See application file for complete search history.

(56) References Cited

U.S. PATENT DOCUMENTS 10,367,428 B2 * 7/2019 Tsuchiya ............. H02M 7/4835
2016/0336874 A1 * 11/2016 Kikuchi ................ H02M 7/483
2020/0161960 A1    5/2020 Mukunoki et al.

FOREIGN PATENT DOCUMENTS

JP    WO 2018/211624 A1    11/2018

OTHER PUBLICATIONS

International Search Report dated Nov. 2, 2020 in PCT/JP2020/035472 filed on Sep. 18, 2020 (2 pages).

* cited by examiner

Primary Examiner — Gary A Nash
(74) Attorney, Agent, or Firm — Oblon, McClelland, Maier & Neustadt, L.L.P.

(57) ABSTRACT

A power conversion device includes a first control device to an m-th control device that are capable of communicating with each other. A k-th control device transmits specific information to control devices other than the k-th control device among the first control device to the m-th control device. The specific information includes voltage values of a plurality of unit converters included in a k-th cell set in each of a first arm to a third arm. From each control device other than the k-th control device among the first control device to the m-th control device, the k-th control device receives specific information including the voltage values of the plurality of unit converters. The k-th control device calculates a phase representative value of the voltage values of the plurality of unit converters included in each of the first arm to the third arm.

4 Claims, 12 Drawing Sheets

(51) Int. Cl.
*H02M 1/12* (2006.01)
*H02M 7/483* (2007.01)
*H02M 7/5387* (2007.01)

(52) U.S. Cl.
CPC ............ *H02M 1/126* (2013.01); *H02M 7/483* (2013.01); *H02M 7/53871* (2013.01)

POWER CONVERSION DEVICE

TECHNICAL FIELD

The present disclosure relates to a power conversion device, and more particularly to a power conversion device including a modular multilevel converter.

BACKGROUND ART

Conventionally, a power conversion device including a modular multilevel converter (MMC) has been known. For example, International Publication No. 2018/211624 (PTL 1) discloses a power conversion device including a three-phase MMC of a delta connection cascade type. A control device of the power conversion device removes the control amount of a full voltage representative value from the computation of a zero-phase voltage command value, to thereby prevent interference between output current control and circulating current control. The above-mentioned power conversion device allows a stable operation of the three-phase MMC even during a transient variation in which charging and discharging of all DC capacitors occur.

CITATION LIST

Patent Literature

PTL 1: International Publication No. 2018/211624

SUMMARY OF INVENTION

Technical Problem

In a large-capacity power conversion device, each converter outputs a high voltage or a high current. Thus, such a large-capacity power conversion device is often configured by multiplexing a plurality of converters in series or in parallel. It has been known that multiplexing of converters not only increases the capacity of each converter but also combines the outputs thereof to thereby reduce harmonics included in the output voltage waveform so as to reduce a harmonic current flowing out of the conversion device.

Since MMCs can be increased in withstand voltage and capacity, such MMCs serve as converters that each can be interconnected to a power system, and thus, have been widely applied to a high-voltage direct-current (DC) (HVDC) power transmission, BTB (back-to-back) (an asynchronous interconnection device), a frequency changer (FC), a reactive power compensator (STATCOM: STATic synchronous COMpensator), and the like.

An MMC consists of arms each formed by a cascade connection of a plurality of unit converters, each of which is referred to as a cell. In each cell including a plurality of semiconductor switches and a DC capacitor, the semiconductor switches are turned on and off to thereby output a voltage across the DC capacitor or a zero voltage.

A three-phase MMC can be formed in various configurations depending on arm connecting methods. One of the configurations is a delta connection cascade configuration. The three-phase MMC in a delta connection cascade configuration (hereinafter also referred to as a "delta-connected MMC") has a configuration formed by a delta connection of arms, each of which is formed by a cascade connection of a plurality of cells, to which a reactor is further connected in series. The delta-connected MMC is connected in parallel to an alternating-current (AC) power system through a reactor or a converter. This causes two current components of: a current that flows through phases from the system; and a current that is not output to the system side but circulates through the delta connection. Accordingly, in the delta-connected MMC, these current components need to be controlled. Further, each cell includes a DC capacitor that does not have a power supply, and thus, the voltage needs to be controlled to fall within a prescribed range.

As described above, the delta-connected MMC is characterized by including a path circulating through the delta connection. In other words, the current flowing through each arm includes: an output current component that is output to the system; and a circulating current component that circulates through the delta connection. Thus, these two current components are controlled in the delta-connected MMC.

Further, in the delta-connected MMC, each cell includes a DC capacitor, and thus, variations in voltage among the DC capacitors may cause an imbalance in voltage of the DC capacitors among phases. Accordingly, the voltage in each DC capacitor needs to be controlled in order to suppress such an imbalance.

Increasing the number of unit converters included in each arm of the MMC can facilitate an increased capacity of the power conversion device including the MMC. However, the number of cells connectable to the control device of the power conversion device disclosed in PTL 1 is limited by: the number of connecting connectors included in the control device; and the computing capability of the control device, and therefore, can be increased only up to the number of cells that can be controlled by the control device.

The present disclosure has been made in order to solve the above-described problems. An object of the present disclosure is to facilitate an increased capacity of a power conversion device including an MMC.

Solution to Problem

A power conversion device according to the present disclosure is interconnected to a three-phase AC power supply. The power conversion device includes a power converter. The power converter includes a first arm, a second arm, and a third arm that are connected by a delta connection. Each of the first arm to the third arm includes a first cell set to an m-th cell set that are connected in series (where m is an integer equal to or greater than 2). The power conversion device further includes a first control device to an m-th control device that are capable of communicating with each other. The first control device to the m-th control device each control a corresponding one of the first cell set to the m-th cell set. Each of the first cell set to the m-th cell set includes a plurality of unit converters connected in series. Each of the first control device to the m-th control device generates: a voltage command value used for controlling a current flowing between the three-phase AC power supply and the power converter; and a zero-phase voltage command value used for controlling a circulating current flowing through the delta connection, and generates an arm voltage command value for each of the first arm to the third arm based on the voltage command value and the zero-phase voltage command value. A k-th control device (where k is an integer equal to or greater than 1 and equal to or less than m) included in the first control device to the m-th control device transmits specific information to control devices other than the k-th control device among the first control device to the m-th control device, the specific information including voltage values of the unit converters included in a k-th cell set in each of the first arm to the third arm. The k-th control device receives specific information from each control device other than the k-th control device among the first control device to the m-th control device, the specific information including the voltage values of the unit converters included in a cell set controlled by the each control device other than the k-th control device. For each of the first arm to the third arm, the k-th control device calculates a phase representative value of the voltage values of the unit converters included in each of the first arm to the third arm, and generates a cell voltage command value of each of the unit converters included in the k-th cell set in each of the first arm to the third arm, using the arm voltage command value and the phase representative value for each of the first arm to the third arm. The k-th control device outputs a control signal to a unit converter corresponding to the cell voltage command value, the control signal being used for controlling the unit converter according to the cell voltage command value.

Advantageous Effects of Invention

According to the power conversion device of the present disclosure, each of the first control device to the m-th control device configured to be capable of communicating with each other controls a corresponding one of the first cell set to the m-th cell set in each of the first arm to the third arm, and thereby, an increased capacity can be facilitated.

DESCRIPTION OF EMBODIMENTS

Figure 1:
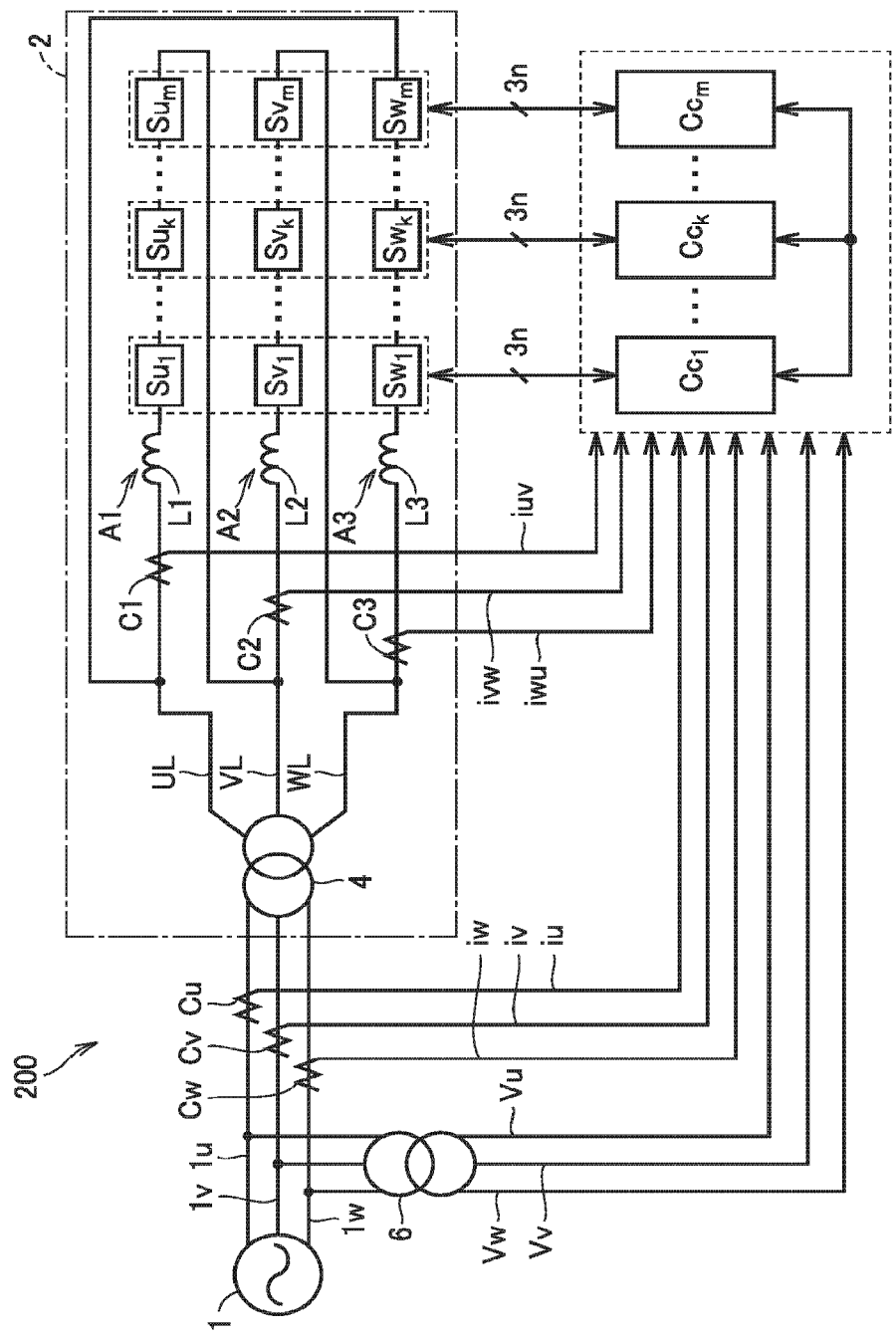
FIG. 1 is a circuit block diagram showing a configuration of a power conversion device according to the first embodiment.

The following describes embodiments of the present disclosure in detail with reference to the accompanying drawings. In the following description, the same or corresponding components are denoted by the same reference characters, and description thereof will not be basically repeated.

First Embodiment

FIG. 1 is a circuit block diagram showing a configuration of a power conversion device 200 according to the first embodiment. In FIG. 1, power conversion device 200 is interconnected to a power system 1 (a three-phase AC power supply) and used as a reactive power compensation device that compensates for reactive power in power system 1.

Referring to FIG. 1, power conversion device 200 includes an MMC 2 and a plurality of control devices $Cc_1$ to $Cc_m$ (where m is an integer equal to or greater than 2).

MMC 2 includes a transformer 4 and AC lines UL, VL, and WL of three phases (a U-phase, a V-phase, and a W-phase). Transformer 4 includes three primary windings and three secondary windings. The three primary windings each are connected to a corresponding one of power transmission lines $1u$, $1v$, and $1w$ of three phases in power system 1. The three secondary windings each are connected to one terminal of a corresponding one of AC lines UL, VL, and WL.

MMC 2 is configured to feed or absorb reactive power to or from power system 1 through transformer 4. Specifically, when the three-phase AC voltage (hereinafter also referred to as a "system voltage") in power system 1 lowers, MMC 2 feeds reactive power to power system 1 so as to raise the system voltage. In contrast, when the system voltage rises, MMC 2 absorbs the reactive power from power system 1 so as to lower the system voltage. MMC 2 can compensate for the reactive power by feeding or absorbing the current orthogonal to the system voltage into or from power system 1.

In the ideal state of power conversion device 200, thus, the effective power applicable from power system 1 to MMC 2 is sufficiently smaller than the reactive power. The ideal state includes: the case where power loss inside MMC 2 is substantially zero; and the case where the system voltage is in a three-phase equilibrium state.

MMC 2 corresponds to one example of the "power converter" in the present disclosure. In FIG. 1, MMC 2 is connected to power system 1 through transformer 4, but may be connected to power system 1 through an interconnecting reactor.

MMC 2 further includes arms A1 to A3. Arm A1 is connected between the other terminal of AC line UL and the other terminal of AC line VL. Arm A2 is connected between the other terminal of AC line VL and the other terminal of AC line WL. Arm A3 is connected between the other terminal of AC line WL and the other terminal of AC line UL. In other words, arms A1 to A3 are connected by delta connection.

Increasing the number of unit converters included in each of arms A1 to A3 in MMC 2 can facilitate an increased capacity of the power conversion device including MMC 2. However, the number of cells connectable to one control device is limited by the number of connecting connectors of the control device and the computing capability of the control device, and therefore, can be increased only up to the number of cells that can be controlled by the control device.

Thus, in power conversion device 200, each of the plurality of control devices $Cc_1$ to $Cc_m$ controls a cell set that is a part of the plurality of unit converters (each hereinafter also simply referred to as a "cell") included in each of arms A1 to A3, and also, the plurality of control devices $Cc_1$ to $Cc_m$ entirely control all of the plurality of unit converters included in each of arms A1 to A3. By using the plurality of control devices $Cc_1$ to $Cc_m$, the number of cells included in each of arms A1 to A3 can be increased without being limited by the number of connecting connectors included in one control device and the computing capability of this control device. This can consequently facilitate an increased capacity of power conversion device 200.

Arm A1 includes a plurality of cell sets $Su_1$ to $Su_m$. Cell sets $Su_1$ to $Su_m$ are connected in series in this order. Each of cell sets $Su_1$ to $Su_m$ is controlled by a corresponding one of control devices $Cc_1$ to $Cc_m$. Arm A2 includes a plurality of cell sets $Sv_1$ to $Sv_m$. Cell sets $Sv_1$ to $Sv_m$ are connected in series in this order. Each of cell sets $Sv_1$ to $Sv_m$ is controlled by a corresponding one of control devices $Cc_1$ to $Cc_m$. Arm A3 includes a plurality of cell sets $Sw_1$ to $Sw_m$. The plurality of cell sets $Sw_1$ to $Sw_m$ are connected in series in this order. Each of cell sets $Sw_1$ to $Sw_m$ is controlled by a corresponding one of control devices $Cc_1$ to $Cc_m$.

Arm A1 further includes a reactor L1 connected in series to the plurality of cell sets $Su_1$ to $Su_m$. Reactor L1 is connected between the other terminal of AC line UL and cell set $Su_1$. Arm A2 further includes a reactor L2 connected in series to the plurality of cell sets $Sv_1$ to $Sv_m$. Reactor L2 is connected between the other terminal of AC line VL and cell set $Sv_1$. Arm A3 further includes a reactor L3 connected in series to the plurality of cell sets $Sw_1$ to $Sw_m$. Reactor L3 is connected between the other terminal of AC line WL and cell set $Sw_1$. Reactors L1 to L3 each are disposed to suppress a circulating current flowing through the delta connection.

Figure 2:
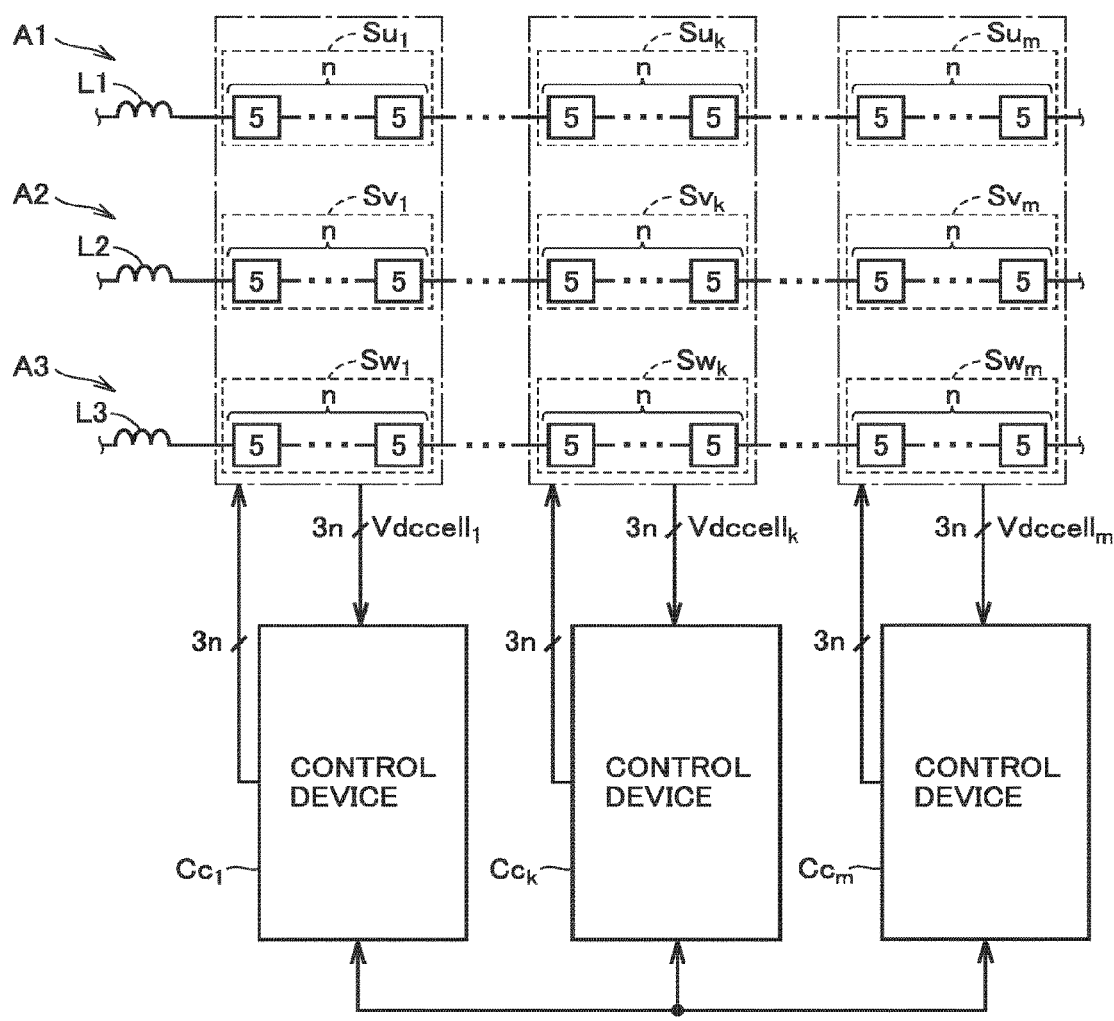
FIG. 2 is a diagram showing a configuration of cell sets in FIG. 1.

FIG. 2 is a diagram showing a configuration of cell sets $Su_1$ to $Su_m$, $Sv_1$ to $Sv_m$, and $Sw_1$ to $Sw_m$ in FIG. 1. Referring to FIGS. 1 and 2, each of cell sets $Su_1$ to $Su_m$, $Sv_1$ to $Sv_m$, and $Sw_1$ to $Sw_m$ has n cells 5 (where n is an integer equal to or greater than 2). Each of the plurality of cells 5 performs bidirectional power conversion according to control signals from control devices $Cc_1$ to $Cc_m$. In the example in FIG. 1, m×n cells are connected in series in each of arms A1 to A3. In other words, MMC 2 has a total of 3×m×n cells 5. The positions of reactors L1 to L3 are not limited to those shown in FIGS. 1 and 2 as long as each of reactors L1 to L3 is connected in series to cells 5 in a corresponding one of the arms. Alternatively, reactors L1, reactors L2, and reactors L3 may be arranged in a dispersed manner in A1, A2, and A3, respectively.

Figure 3:
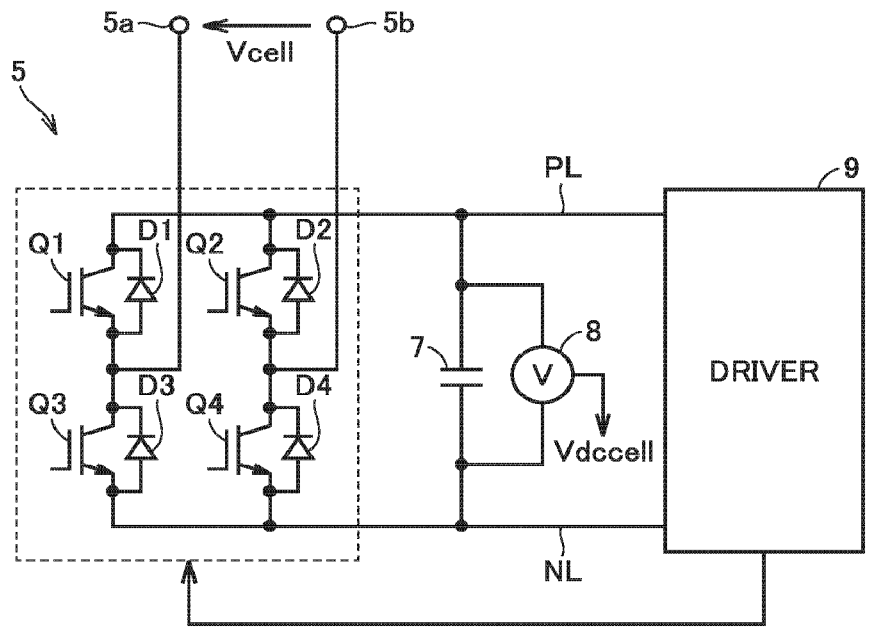
FIG. 3 is a block diagram showing a first configuration example of a cell in FIG. 2.

FIG. 3 is a block diagram showing a first configuration example of cell 5 in FIG. 2. Referring to FIG. 3, cell 5 according to the first configuration example has a so-called full bridge configuration. Specifically, cell 5 includes output terminals 5a and 5b, switching elements Q1 to Q4, diodes D1, D2, D3, and D4, a capacitor 7, a voltage detector 8, and a driver 9.

Switching elements Q1 to Q4 each are a self-arc extinguishing power semiconductor element and formed of an insulated gate bipolar transistor (IGBT), for example. Switching elements Q1 and Q3 are connected in series between a pair of power lines (a positive electrode line PL and a negative electrode line NL). Switching elements Q2 and Q4 are connected in series between a pair of power lines. Switching elements Q1 and Q2 have collectors both connected to positive electrode line PL. Switching elements Q3 and Q4 have emitters both connected to negative electrode line NL. A connection point between the emitter of switching element Q1 and the collector of switching element Q3 is connected to output terminal 5a. A connection point between the emitter of switching element Q2 and the collector of switching element Q4 is connected to output terminal 5b. Diodes D1, D2, D3, and D4 are connected in antiparallel to switching elements Q1, Q2, Q3, and Q4, respectively.

Capacitor 7 is connected between positive electrode line PL and negative electrode line NL, and DC power is stored in capacitor 7. Voltage detector 8 detects a DC voltage between the terminals of capacitor 7 (hereinafter also simply referred to as a "capacitor voltage Vdccell"). Voltage detector 8 outputs a signal showing capacitor voltage Vdccell to a control device corresponding to cell 5. In other words, voltage detector 8 in cell 5 included in one of cell sets $Su_k$, $Sv_k$, and $Sw_k$ outputs capacitor voltage Vdccell as a voltage value of cell 5 to control device $Cc_k$ (where k is an integer equal to or greater than 1 and equal to or less than m).

Driver 9 is connected to positive electrode line PL and negative electrode line NL and driven by the DC power stored in capacitor 7. Driver 9 controls switching elements Q1 to Q4 to be turned on and off (switching operation) based on a gate signal from a control device corresponding to cell 5. In accordance with the switching operations of switching elements Q1 to Q4, cell 5 can switch an output voltage Vcell between output terminals 5a and 5b to be set at +Vdccell, 0, or −Vdccell. In the example in FIG. 3, capacitor 7 is used as a power supply for driving driver 9, but another power supply (for example, another power supply line, a separately-installed power supply, or the like) may be used for driving driver 9.

Figure 4:
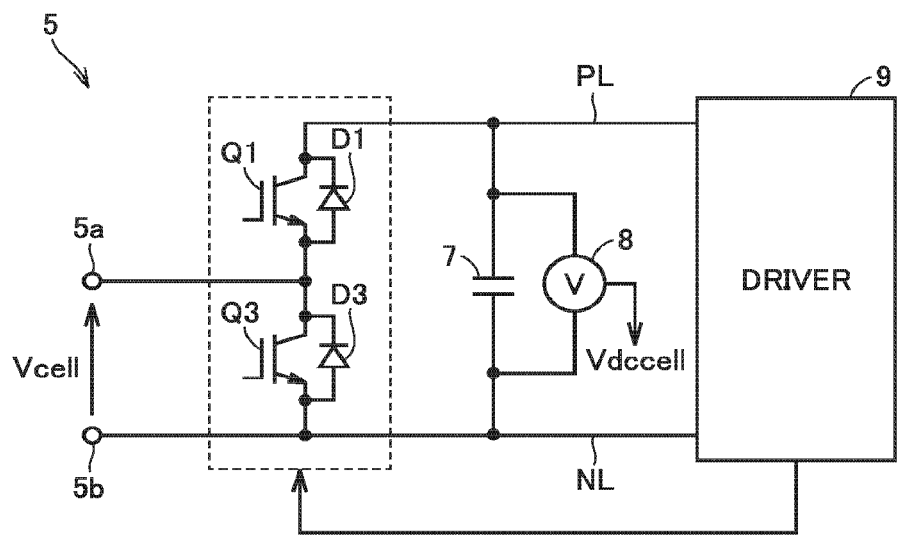
FIG. 4 is a block diagram showing a second configuration example of the cell in FIG. 2.

FIG. 4 is a block diagram showing a second configuration example of cell 5 in FIG. 2. Referring to FIG. 4, cell 5 according to the second configuration example has a so-called half-bridge configuration. Specifically, cell 5 includes output terminals 5a and 5b, switching elements Q1 and Q3, diodes D1 and D3, a capacitor 7, a voltage detector 8, and a driver 9.

Switching element Q1 is connected between positive electrode line PL and output terminal 5a. Switching element Q3 is connected between output terminals 5a and 5b. Diodes D1 and D3 are connected in antiparallel to switching elements Q1 and Q3, respectively.

Capacitor 7 is connected between output terminals 5a and 5b through switching element Q1. Driver 9 controls the switching operations of switching elements Q1 and Q3 based on a gate signal from a control device corresponding to cell 5. According to the switching operations of switching elements Q1 and Q3, cell 5 can set output voltage Vcell between output terminals 5a and 5b to be set at ±Vdccell or 0.

The configuration of cell 5 is not limited to the configuration examples shown in FIGS. 3 and 4 as long as cell 5 is formed of: a series circuit consisting of a plurality of (for example, two) switching elements; and a capacitor connected in parallel with the series circuit, and also configured to selectively output capacitor voltage Vdccell between output terminals 5a and 5b according to the switching operations of the plurality of switching elements.

In the first embodiment, a semiconductor switching element is used as a switching element in cell 5, but any switching element (for example, a mechanical switch) may also be used in place of a semiconductor switching element as long as such a switching element is controlled by driver 9 to be turned on and off so as to allow passage and interruption of a current.

In cell 5, capacitor 7 corresponds to one example of the "power storage element". Also, capacitor voltage Vdccell detected by voltage detector 8 corresponds to the "voltage in the power storage element".

In each of arms A1 to A3, output terminal 5a of cell 5 in the first stage is connected to the other terminal of a corresponding one of AC lines UL, VL, WL through a corresponding one of reactors L1 to L3. Also in each of arms A1 to A3, output terminal 5b of cell 5 in the last stage is connected to the other terminal of a corresponding one of AC lines VL, WL, and UL. In each of the arms, each of other cells 5 excluding cells 5 in the first stage and the last stage has: output terminal 5a connected to output terminal 5b of cell 5 in a stage preceding the stage of each of the other cells; and output terminal 5b connected to output terminal 5a of cell 5 in a stage subsequent to the stage of each of the other cells.

Again referring to FIG. 1, current detectors Cu, Cv, and Cw for detecting respective currents iu, iv, and iw (each hereinafter referred to as an "output current") flowing between power system 1 and MMC 2 are disposed in respective power transmission lines 1u, 1v, and 1w of three phases in power system 1. Further, a voltage detector 6 for detecting three-phase AC voltages (each hereinafter also referred to as a "system voltage") Vu, Vv, and Vw in power system 1 is disposed on power transmission lines 1u, 1v, and 1w.

Further, a current detector C1 for detecting a current flowing through arm A1 (hereinafter referred to as an "arm current iuv") is disposed on AC line UL. A current detector C2 for detecting a current flowing through arm A2 (hereinafter referred to as an "arm current ivw") is disposed on AC line VL. A current detector C3 for detecting a current flowing through arm A3 (hereinafter referred to as an "arm current iwu") is disposed on AC line WL.

Output currents iu, iv, and iw, respectively, can also be computed based on the values of arm currents iuv, ivw, and iwu detected by current detectors C1, C2, and C3 without using current detectors Cu, Cv, and Cw. In other words, Iu=Iuv−Iwu, Iv=Ivw−Iuv, and Iw=Iwu−Ivw.

These values detected by current detectors Cu, Cv, Cw, and C1 to C3 and voltage detector 6 are input into each of control devices $Cc_1$ to $Cc_m$. Control devices $Cc_1$ to $Cc_m$ use a command from a host controller (not shown), a detection signal input from each of these detectors, and the like to control the operation of each of m×n cells 5 included in each of arms A1 to A3.

Each of control devices $Cc_1$ to $Cc_m$ can be configured, for example, of a microcomputer and the like. By way of example, each of control devices $Cc_1$ to $Cc_m$ incorporates a memory (not shown) and a control processing unit (CPU), and thus, can execute control operations (described below) by software processing implemented by the CPU executing a program stored in advance in the memory. Alternatively, part or all of the control operation can also be implemented by hardware processing using a built-in dedicated electronic circuit or the like in place of software processing.

Figure 5:
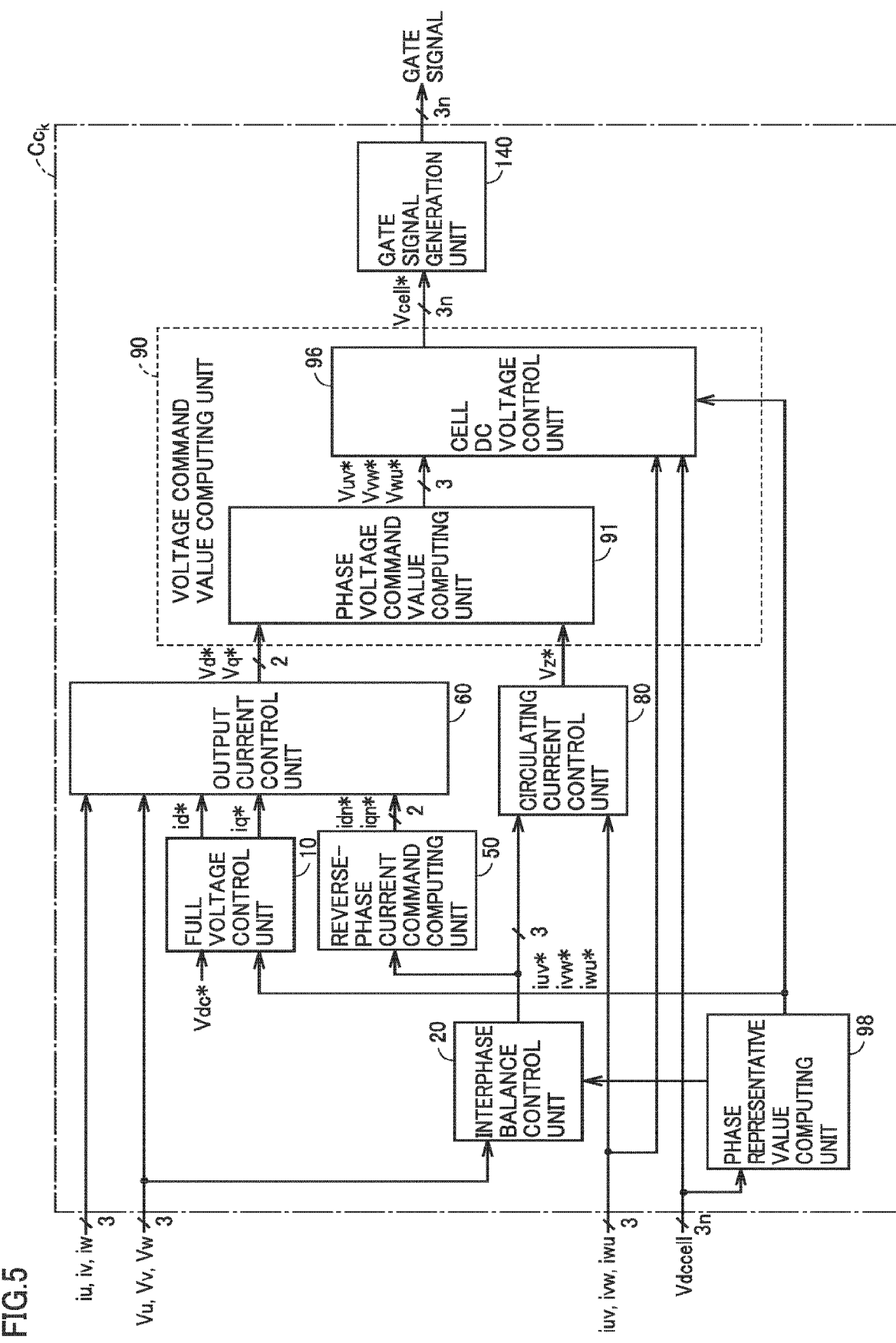
FIG. 5 is a block diagram showing a configuration of a control device in FIG. 1.

FIG. 5 is a block diagram showing a configuration of one of control devices $Cc_1$ to $Cc_m$ in FIG. 1. Since the configurations of control devices $Cc_1$ to $Cc_m$ are the same, the configuration of control device $Cc_k$ will be described below. The functions of the blocks shown in FIG. 5 can be implemented by software processing and/or hardware processing executed by control device $Cc_k$.

Referring to FIG. 5, control device $Cc_k$ includes a full voltage control unit 10, an interphase balance control unit 20, a reverse-phase current command computing unit 50, an output current control unit 60, a circulating current control unit 80, a voltage command value computing unit 90, a gate signal generation unit 140, and a phase representative value computing unit 98.

Output current control unit 60 controls output currents iu, iv, and iw from MMC 2 to control: the effective power transmitted and received between power system 1 and MMC 2; and the reactive power output from MMC 2 to power system 1. Output current control unit 60 controls the effective power transmitted and received between power system 1 and MMC 2, to thereby cause a representative value Vdc of voltage values Vdccell in all capacitors 7 included in MMC 2 to follow a DC voltage command value Vdc*. DC voltage command value Vdc* may be input from a host controller (not shown) or may be determined in advance in control device $Cc_k$. Output current control unit 60 also controls the reactive power output from MMC 2 to power system 1 to thereby stabilize the system voltage.

An effective current command value iq* used for effective current control is computed by full voltage control unit 10. A reactive current command value id* used for reactive current control is computed, for example, from the positive-phase voltage of power system 1. Reactive current command value id* may be input from a host controller or may be determined in advance in control device $Cc_k$.

Specifically, output current control unit 60 executes a control computation for causing a reactive current id and an effective current iq obtained by three-phase/dq conversion of output currents iu, iv, and iw in MMC 2 to follow output current command values idpn* and iqpn*, respectively, generated by combining positive-phase current command values id* and iq* with reverse-phase current command values idn* and iqn*, to thereby generate voltage command values Vd* and Vq*. Voltage command values Vd* and Vq* consist of a voltage component Vd* in phase with the reactive current and a voltage component Vq* in phase with the effective current.

Circulating current control unit 80 controls a circulating current iz flowing through the delta connection, to thereby balance voltage value Vdccell of capacitor 7 among the phases in MMC 2. Circulating current control unit 80 utilizes circulating current iz to cause each of arms A1 to A3 to balance the representative value of voltage values Vdccell in capacitors 7 among first arm A1 to third arm A3. Specifically, circulating current control unit 80 generates a zero-phase voltage command value Vz* by executing a control computation for causing circulating current iz to follow a circulating current command value iz* generated by interphase balance control unit 20.

Voltage command value computing unit 90 performs dq/three-phase conversion of voltage command values Vd* and Vq*, which are generated by output current control unit 60, so as to be set back to voltage command values of three phases.

Voltage command value computing unit 90 adds zero-phase voltage command value Vz* to each of these voltage command values of three phases to thereby generate arm voltage command values Vuv*, Vvw*, and Vwu*.

Voltage command value computing unit 90 further generates an output voltage command value Vcell* used for controlling output voltage Vcell from each cell 5 controlled by control device $Cc_k$, based on: arm voltage command values Vuv*, Vvw*, and Vwu*; capacitor voltage Vdccell in cell 5 controlled by control device $Cc_k$; arm currents iuv, ivw, and iwu; and the representative value of the voltage values of cells 5 included in each of arms A1 to A3. In the present embodiment, 3×n output voltage command values Vcell* are generated corresponding to 3×n cells 5.

Based on 3×n output voltage command values Vcell*, gate signal generation unit 140 generates a gate signal to be supplied to each of 3×n cells 5.

Figure 6:
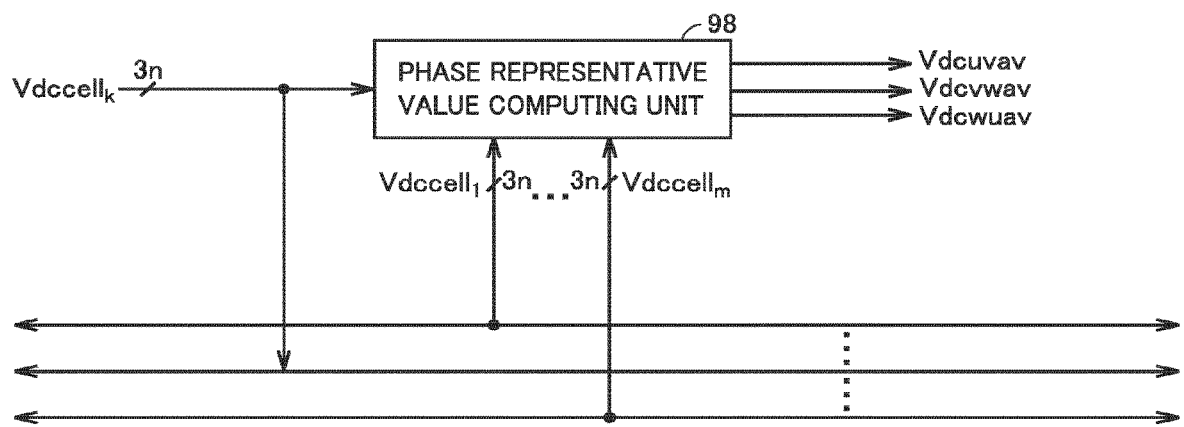
FIG. 6 is a diagram showing details of inputs and outputs of a phase representative value computing unit in FIG. 5.

FIG. 6 is a diagram showing details of inputs and outputs of phase representative value computing unit 98 in FIG. 5. Referring to FIG. 6, from each control device other than control device $Cc_k$, phase representative value computing unit 98 receives capacitor voltages Vdccell (specific information) of 3×n capacitors 7 included in a cell set controlled by the control device. Then, 3×n capacitor voltages $Vdccell_k$ (specific information) are transmitted to each of the control devices other than control device $Cc_k$. Phase representative value computing unit 98 calculates a representative value of m×n capacitor voltages Vdccell (a U-V phase voltage representative value Vdcuvav) by computation processing (for example, addition processing or comparison processing) for capacitor voltages Vdccell of m×n capacitors 7 included in arm A1. Phase representative value computing unit 98 calculates a representative value of m×n capacitor voltages Vdccell (a V-W phase voltage representative value Vdcvwav) by computation processing for capacitor voltages Vdccell of m×n capacitors 7 included in arm A2. Phase representative value computing unit 98 calculates a representative value of m×n capacitor voltages Vdccell (a W-U phase voltage representative value Vdcwuav) by computation processing for capacitor voltages Vdccell of m×n capacitors 7 included in arm A3.

U-V phase voltage representative value Vdcuvav may be any one of the average value, the maximum value, and the minimum value of m×n capacitor voltages Vdccell in arm A1. V-W phase voltage representative value Vdcvwav may be any one of the average value, the maximum value, and the minimum value of m×n capacitor voltages Vdccell in arm A2. W-U phase voltage representative value Vdcwuav may be any one of the average value, the maximum value, and the minimum value of m×n capacitor voltages Vdccell in arm A3.

The following is a summary of the above description. Specifically, each of control devices $Cc_1$ to $Cc_m$ performs: output current control for controlling output currents iu, iv, and iw in order to perform charging and discharging so as to cause representative value Vdc of voltage values Vdccell of all capacitors 7 to follow DC voltage command value Vdc* and in order to output desired reactive power to power system 1; and circulating current control for controlling circulating current iz flowing through the delta connection in order to balance voltage values Vdccell of capacitors 7 among the phases. Each of control devices $Cc_1$ to $Cc_m$ combines voltage command values Vd* and Vq* generated by the output current control with zero-phase voltage command value Vz* generated by the circulating current control, to thereby generate arm voltage command values Vuv*, Vvw*, and Vwu*. Each of control devices $Cc_1$ to $Cc_m$ generates a cell voltage command value Vcell* used for controlling output voltage Vcell from each cell 5, based on arm voltage command values Vuv*, Vvw*, and Vwu*, capacitor voltage Vdccell in each cell 5, arm currents iuv, ivw, and iwu, and the representative value of the voltage values in cells 5 included in each of arms A1 to A3. When switching elements Q1 to Q4 in each of cells 5 are turned on and off according to the gate signals, output voltage Vcell corresponding to cell voltage command value Vcell* can be generated between output terminals 5a and 5b in each cell 5.

Figure 7:
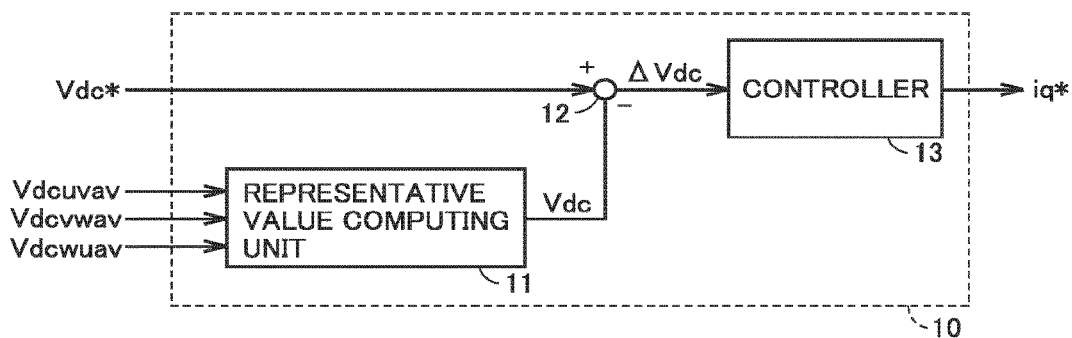
FIG. 7 is a diagram showing a configuration example of a full voltage control unit shown in FIG. 5.

FIG. 7 is a diagram showing a configuration example of full voltage control unit 10 shown in FIG. 5. Referring to FIG. 7, full voltage control unit 10 includes a representative value computing unit 11, a subtractor 12, and a controller 13.

Representative value computing unit 11 computes a representative value of capacitor voltages Vdccell in 3×m×n capacitors 7 (hereinafter also referred to as a "full voltage representative value Vdc") based on phase voltage representative values Vdcuvav, Vdcvwav, and Vdcwuav that are calculated by phase representative value computing unit 98. Full voltage representative value Vdc may be, for example, the average value, the maximum value, the minimum value or the like of 3×m×n capacitor voltages Vdccell. Alternatively, in place of these computed values, the values obtained by filtering these computed values can be used.

Subtractor 12 obtains a deviation ΔVdc between DC voltage command value Vdc* and full voltage representative value Vdc.

Controller 13 executes a control computation for setting the computed deviation ΔVdc at zero, i.e., for causing full voltage representative value Vdc to follow DC voltage command value Vdc*, to thereby generate a positive-phase effective current command value iq*. Controller 13 outputs the generated positive-phase effective current command value iq* to output current control unit 60.

Figure 8:
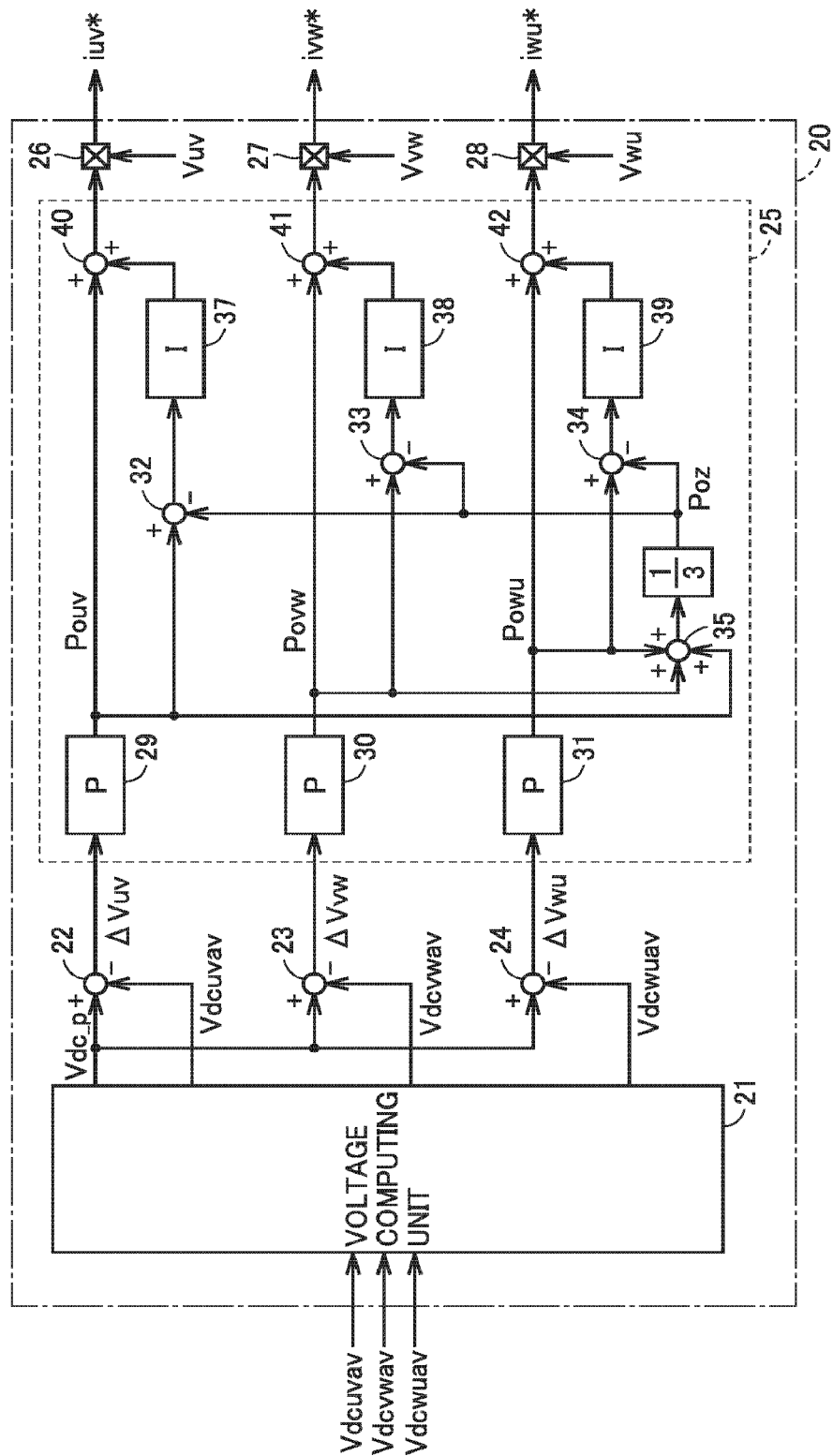
FIG. 8 is a diagram showing a configuration example of an interphase balance control unit shown in FIG. 5.

FIG. 8 is a diagram showing a configuration example of interphase balance control unit 20 shown in FIG. 5. Referring to FIG. 8, interphase balance control unit 20 includes a voltage computing unit 21, subtractors 22, 23, and 24, a controller 25, and multipliers 26, 27, and 28.

Voltage computing unit 21 computes a representative value Vdc_p of capacitor voltages Vdccell in 3×m×n capacitors 7 (a full voltage representative value) based on phase voltage representative values Vdcuvav, Vdcvwav, and Vdcwuav that are calculated by phase representative value computing unit 98.

Full voltage representative value Vdc_p may be, for example, the average value, the maximum value, or the minimum value of 3×m×n capacitor voltages Vdccell. Alternatively, in place of these computed values, a value obtained by filtering the computed values may be used or DC voltage command value Vdc* may be used. Filtering of the computed values can remove the high frequency component and the specific frequency component included in the input component of controller 25. Thereby, the operation of controller 25 can be further stabilized. Full voltage representative value Vdc_p in interphase balance control unit 20 may be the same as or different from full voltage representative value Vdc in full voltage control unit 10.

Subtractor 22 obtains a deviation ΔVuv between full voltage representative value Vdc_p and U-V phase voltage representative value Vdcuvav. Subtractor 23 obtains a deviation ΔVvw between full voltage representative value Vdc_p and V-W phase voltage representative value Vdcvwav. Subtractor 24 obtains a deviation ΔVwu between full voltage representative value Vdc_p and W-U phase voltage representative value Vdcwuav.

Controller 25 corrects the current command value so as to set each of deviations ΔVuv, ΔVvw, and ΔVwu at zero, i.e., so as to cause each of phase voltage representative values Vdcuvav, Vdcvwav, and Vdcwuav to follow full voltage representative value Vdc_p.

The current command value may be corrected by correcting only circulating current command value iz*, or by correcting only reverse-phase current command values idn* and iqn* generated by reverse-phase current command computing unit 50, or by correcting both circulating current command value iz* and reverse-phase current command values idn*, iqn*. In other words, in the example in FIG. 5, the imbalance in capacitor voltage Vdccell among the phases is controlled by circulating current iz and reverse-phase currents idn and iqn.

In the configuration in which the imbalance in capacitor voltage Vdecell among the phases is controlled only by circulating current iz, when an imbalance among system voltages Vu, Vv, and Vw increases deviations ΔVuv, ΔVvw, and ΔVwu, high circulating current iz is required to flow in order to eliminate such an imbalance, with the result that a high current flows through MMC 2. As described above, as the imbalance in capacitor voltage Vdccell among the phases is controlled by circulating current iz and reverse-phase currents idn and iqn, the current flowing through MMC 2 for eliminating the above-mentioned imbalance can be reduced. Thereby, the rated current in MMC 2 can be reduced, so that MMC 2 can be reduced in size.

In this case, for charging and discharging of capacitor 7 in each cell 5, the effective power needs to be controlled. Thus, multiplier 26 multiplies the output from controller 25 by arm voltage Vuv to obtain an arm current command value iuv*. Multiplier 27 multiplies the output from controller 25 by an arm voltage Vvw to obtain an arm current command value ivw*. Multiplier 28 multiplies the output from controller 25 by an arm voltage Vwu to obtain an arm current command value iwu*. Interphase balance control unit 20 outputs arm current command values iuv*, ivw*, and iwu* to reverse-phase current command computing unit 50 and circulating current control unit 80.

Arm voltages Vuv, Vvw, and Vwu may be directly detected by using a voltage detector, or may be estimated from system voltages Vu, Vv, and Vw and arm currents iuv, ivw, and iwu.

Controller 25 includes proportional units (P) 29 to 31, adders 35 and 40 to 42, subtractors 32 to 34, and integrators (I) 37 to 39. Proportional units 29, 30, and 31 are connected in series to integrators 37, 38, and 39, respectively.

Proportional unit 29 calculates an operation amount Pouv used for proportionally controlling deviation ΔVuv between full voltage representative value Vdc_p and U-V phase voltage representative value Vdcuvav. Operation amount Pouv calculated by proportional unit 29 is input into subtractor 32 and adders 35, 40.

Proportional unit 30 calculates an operation amount Povw used for proportionally controlling deviation ΔVvw between full voltage representative value Vdc_p and V-W phase voltage representative value Vdcvwav. Operation amount Povw calculated by proportional unit 30 is input into subtractor 33 and adders 35, 41.

Proportional unit 31 calculates an operation amount Powu used for proportionally controlling deviation ΔVwu between full voltage representative value Vdc_p and W-U phase voltage representative value Vdcwuav. Operation amount Powu calculated by proportional unit 31 is input into subtractor 34 and adders 35, 42.

Operation amounts Pouv, Povw, and Powu for proportional control are added by adder 35 to obtain an addition result which is then divided by 3, to thereby generate an operation amount Poz. The generated operation amount Poz corresponds to a zero-phase component that is a common component among the phases. This common component is included commonly in voltage representative values Vdcuvav, Vdcvwav, and Vdcwuav of the phases, and also, depends on deviation ΔVdc between voltage command value Vdc* and full voltage representative value Vdc. The common component corresponds to a zero-phase component of deviations ΔVuv, ΔVvw, and ΔVwu.

Subtractor 32 subtracts operation amount Poz from operation amount Pouv, and then, inputs the subtraction result (Pouv−Poz) to integrator 37. Integrator 37 calculates an operation amount Iouv used for integral control of an operation amount Pouv−Poz. Adder 40 adds operation amount Pouv and operation amount Iouv, and then, outputs an addition result Pouv+Iouv to multiplier 26.

Subtractor 33 subtracts operation amount Poz from operation amount Povw, and then, inputs a subtraction result (Pouv−Poz) to integrator 38. Integrator 38 calculates an operation amount Iovw for integral control of an operation amount Povw−Poz. Adder 41 adds operation amount Povw and operation amount Iovw, and then, outputs an addition result Povw+Iovw to multiplier 27.

Subtractor 34 subtracts operation amount Poz from operation amount Powu, and then, inputs a subtraction result (Powu−Poz) into integrator 39. Integrator 39 calculates an operation amount Iowu used for integral control of an operation amount Powu−Poz. Adder 42 adds operation amount Powu and operation amount Iowu, and then, outputs an addition result Powu+Iowu to multiplier 28.

Controller 25 in interphase balance control unit 20 is configured as shown in FIG. 8, so that interference between interphase balance control unit 20 and full voltage control unit 10 can be prevented. Thus, even during a transient variation in which charging and discharging of capacitors in all cells 5 included in MMC 2 occur, the imbalance in capacitor voltage Vdccell among the phases can be suppressed. Thereby, a stable operation of MMC 2 is implemented.

Figure 9:
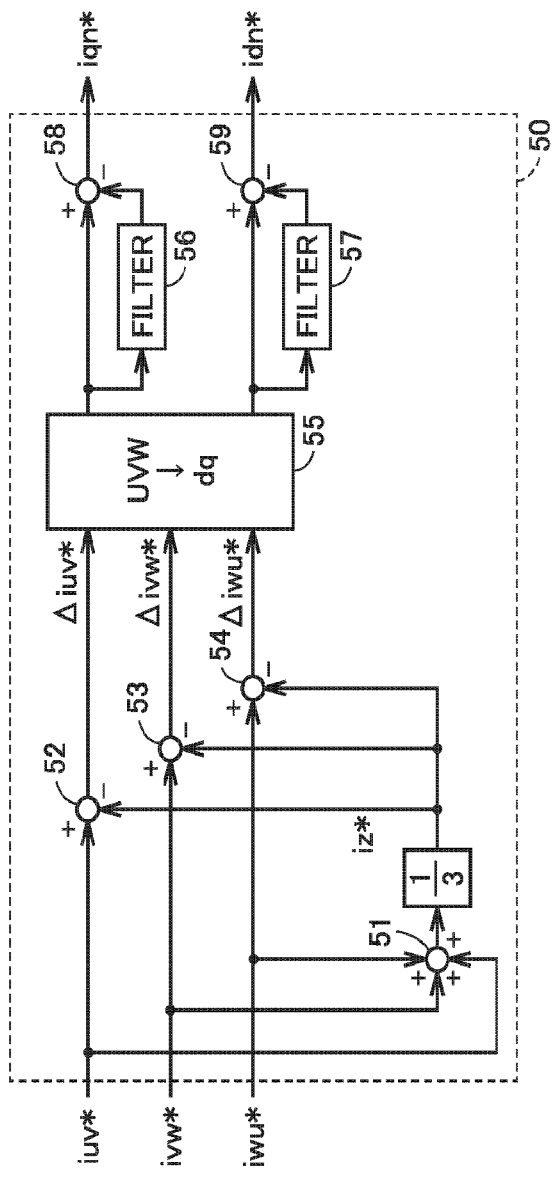
FIG. 9 is a diagram showing a configuration example of a reverse-phase current command computing unit shown in FIG. 5.

FIG. 9 is a diagram showing a configuration example of reverse-phase current command computing unit 50 shown in FIG. 5. Reverse-phase current command computing unit 50 generates reverse-phase current command values idn* and iqn* from arm current command values iuv*, ivw* and iwu*. Reverse-phase current command values idn* and iqn* consist of a reverse-phase reactive current command value idn* and a reverse-phase effective current command value iqn*.

Referring to FIG. 9, reverse-phase current command computing unit 50 includes an adder 51, subtractors 52 to 54, 58 and 59, a coordinate conversion unit 55, and filters 56 and 57.

Adder 51 adds arm current command values iuv*, ivw*, and iwu* generated by interphase balance control unit 20. The addition result obtained by adder 51 is divided by 3, to thereby generate circulating current command value iz*.

Subtractor 52 obtains a deviation Δiuv* between arm current command value iuv* and circulating current command value iz*. Subtractor 53 obtains a deviation Δivw* between arm current command value ivw* and circulating current command value iz*. Subtractor 54 obtains a deviation Δiwu* between arm current command value iwu* and circulating current command value iz*. In other words, subtractors 52, 53, and 54 each extract a positive-phase component and a reverse-phase component of a corresponding one of arm current command values iuv*, ivw*, and iwu*.

Coordinate conversion unit 55 performs three-phase/two-phase conversion for these extracted positive-phase component and reverse-phase component (deviations Δiuv*, Δivw*, and Δiwu*) in a positive-phase coordinate system.

Filters 56 and 57 extract positive-phase components from the outputs of coordinate conversion unit 55. Specifically, filters 56 and 57 each are configured to remove a reverse-phase component from the value input into the filters and extract a positive-phase component. In the positive-phase coordinate system, the positive-phase component is a DC component while the reverse-phase component is a double frequency component (2f) of the fundamental wave frequency. Thus, a first order lag filter, a 2f moving average filter, a 2f notch filter and the like are used as filters 56 and 57.

Subtractor 58 subtracts the output of filter 56 from the output of coordinate conversion unit 55 to thereby generate reverse-phase effective current command value iqn*. Subtractor 59 subtracts the output of filter 57 from the output of coordinate conversion unit 55 to thereby generate reverse-phase reactive current command value idn*.

Figure 10:
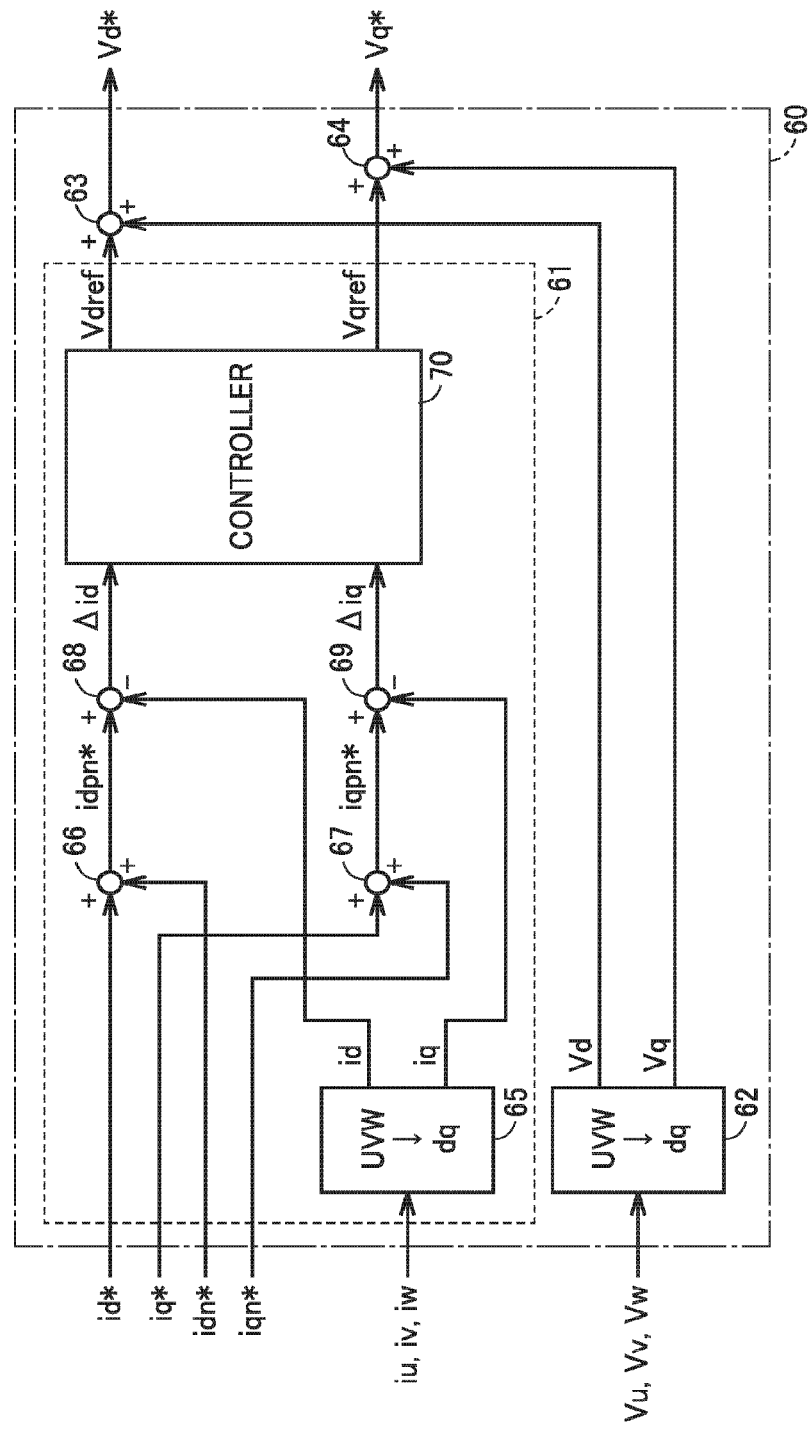
FIG. 10 is a diagram showing a configuration example of an output current control unit shown in FIG. 5.

FIG. 10 is a diagram showing a configuration example of output current control unit 60 shown in FIG. 5. Output current control unit 60 generates voltage command values Vd* and Vq* by executing a control computation for causing reactive current id and effective current iq obtained by dq conversion of output currents iu, iv, and iw from MMC 2 to follow output current command values idpn* and iqpn*, respectively, that are generated by combining positive-phase current command values id* and iq* with reverse-phase current command values idn* and iqn*.

Referring to FIG. 10, output current control unit 60 includes a reference voltage computing unit 61, a coordinate conversion unit 62, and adders 63 and 64.

Reference voltage computing unit 61 combines positive-phase current command values id* and iq* with reverse-phase current command values idn* and iqn*, respectively, to thereby generate current command values idpn* and iqpn* used for controlling output currents iu, iv, and iw. Reference voltage computing unit 61 performs a control computation for causing output currents iu, iv, and iw to follow current command values idpn* and iqpn* to thereby generate reference voltages Vdref and Vqref.

Specifically, reference voltage computing unit 61 includes a coordinate conversion unit 65, adders 66 and 67, subtractors 68 and 69, and a controller 70. Coordinate conversion unit 65 performs three-phase/two-phase conversion of output currents iu, iv, and iw in the positive-phase coordinate system, to thereby compute positive-phase reactive current id and positive-phase effective current iq.

Adder 66 adds positive-phase reactive current command value id* and reverse-phase reactive current command value idn* to generate a current command value idpn*. Adder 67 adds positive-phase effective current command value iq* and reverse-phase effective current command value iqn* to generate a current command value iqpn*.

Subtractor 68 obtains a deviation Δid between current command value idpn* and positive-phase reactive current id. Subtractor 69 obtains a deviation Δiq between current command value iqpn* and positive-phase effective current iq.

Controller 70 executes a control computation for setting each of deviations Δid and Δiq at zero, i.e., for causing positive-phase currents id and iq to follow current command values idpn* and iqpn*, respectively, to thereby generate reference voltages Vdref and Vqref.

Coordinate conversion unit 62 performs three-phase/two-phase conversion of system voltages Vu, Vv and Vw in the positive-phase coordinate system, to thereby compute positive-phase voltages Vd and Vq.

In output current control unit 60, adders 63 and 64 respectively add positive-phase voltages Vd and Vq to reference voltages Vdref and Vqref in a feedforward manner, to thereby generate voltage command values Vd* and Vq*. Voltage command values Vd* and Vq* consist of reactive voltage command value Vd* and effective voltage command value Vq*.

Figure 11:
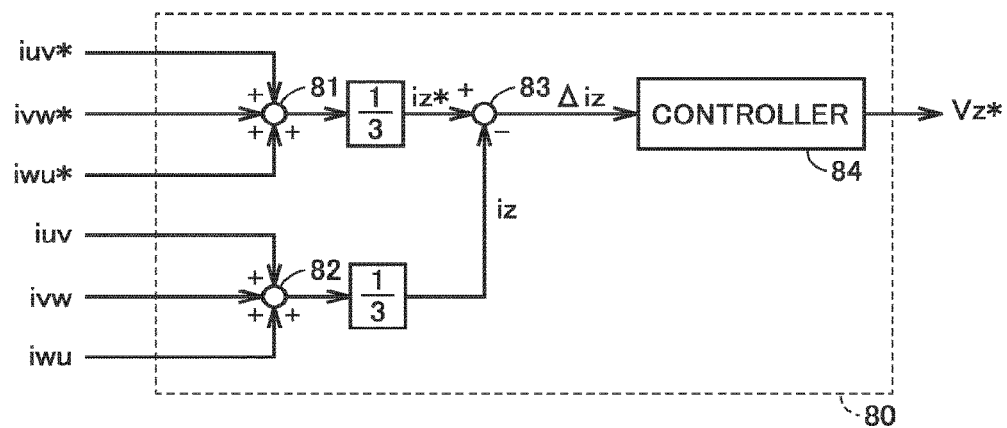
FIG. 11 is a diagram showing a configuration example of a circulating current control unit shown in FIG. 5.

FIG. 11 is a diagram showing a configuration example of circulating current control unit 80 shown in FIG. 5. Circulating current control unit 80 executes current control for balancing capacitor voltage Vdccell among the phases in MMC 2.

Referring to FIG. 11, circulating current control unit 80 includes adders 81 and 82, a subtractor 83, and a controller 84.

Adder 81 adds arm current command values iuv*, ivw*, and iwu* generated by interphase balance control unit 20. The addition result of adder 81 is divided by 3 to thereby generate circulating current command value iz*.

Adder 82 adds arm currents iuv, ivw, and iwu detected by current detectors C1, C2, and C3, respectively. The addition result of adder 82 is divided by 3 to thereby obtain circulating current iz.

Subtractor 83 obtains a deviation Δiz between circulating current command value iz* and circulating current iz. Controller 84 executes a control computation for setting deviation Δiz at zero, i.e., for causing circulating current iz to follow circulating current command value iz*, to thereby generate zero-phase voltage command value Vz*.

Figure 12:
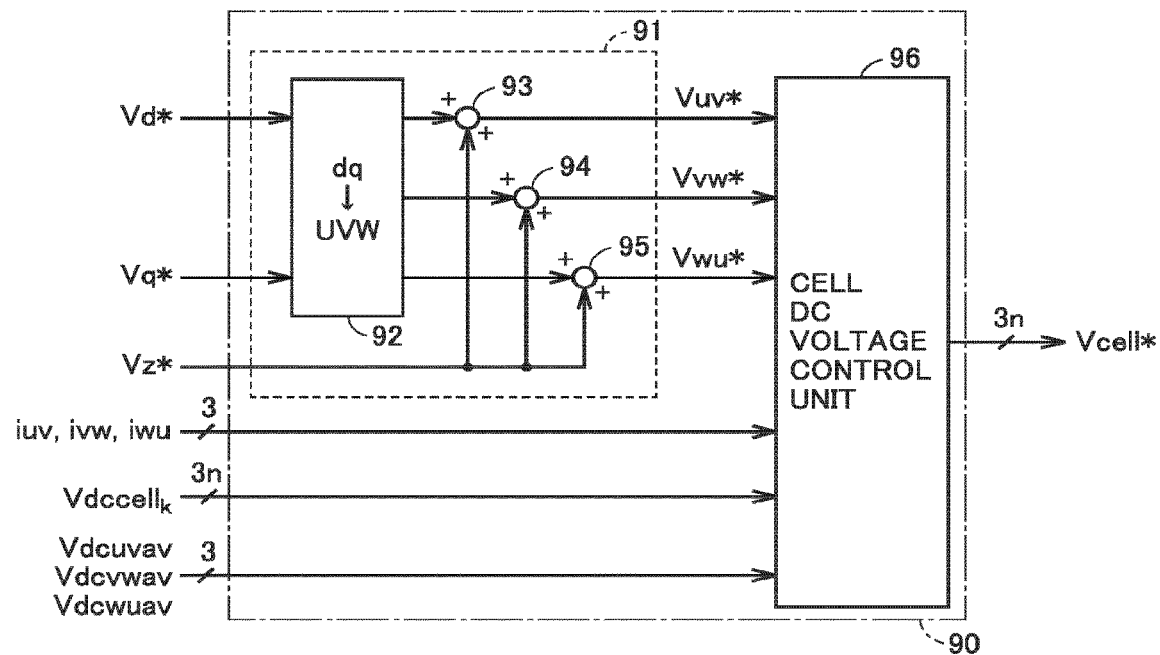
FIG. 12 is a diagram showing a configuration example of a voltage command value computing unit shown in FIG. 5.

FIG. 12 is a diagram showing a configuration example of voltage command value computing unit 90 shown in FIG. 5. Voltage command value computing unit 90 generates output voltage command value Vcell* used for controlling output voltage Vcell from each cell 5 controlled by control device $Cc_k$, based on: voltage command values Vd* and Vq* generated by output current control unit 60; zero-phase voltage command value Vz* generated by circulating current control unit 80; capacitor voltage $Vdccell_k$ in cell 5 controlled by control device $Cc_k$; phase voltage representative values Vdcuvav, Vdcvwav, and Vdcwuav calculated by phase representative value computing unit 98; and arm currents iuv, ivw and iwu.

Referring to FIG. 12, voltage command value computing unit 90 includes a phase voltage command value computing unit 91 and a cell DC voltage control unit 96.

Phase voltage command value computing unit 91 generates arm voltage command values Vuv*, Vvw*, and Vwu* based on voltage command values Vd*, Vq*, and zero-phase voltage command value Vz*. Specifically, phase voltage command value computing unit 91 includes a coordinate conversion unit 92 and adders 93 to 95.

Coordinate conversion unit 92 converts voltage command values Vd* and Vq* into three phases in the positive-phase coordinate system. Adders 93, 94, and 95 each add zero-phase voltage command value Vz* to a corresponding one of the voltage command values converted into three phases, to thereby generate arm voltage command values Vuv*, Vvw*, and Vwu*, respectively.

Cell DC voltage control unit 96 generates output voltage command value Vcell* in each cell 5 based on arm voltage command values Vuv*, Vvw*, and Vwu*, capacitor voltage $Vdccell_k$ in each cell 5, phase voltage representative values Vdcuvav, Vdcvwav, and Vdcwuav, and arm currents iuv, ivw, and iwu.

Figure 13:
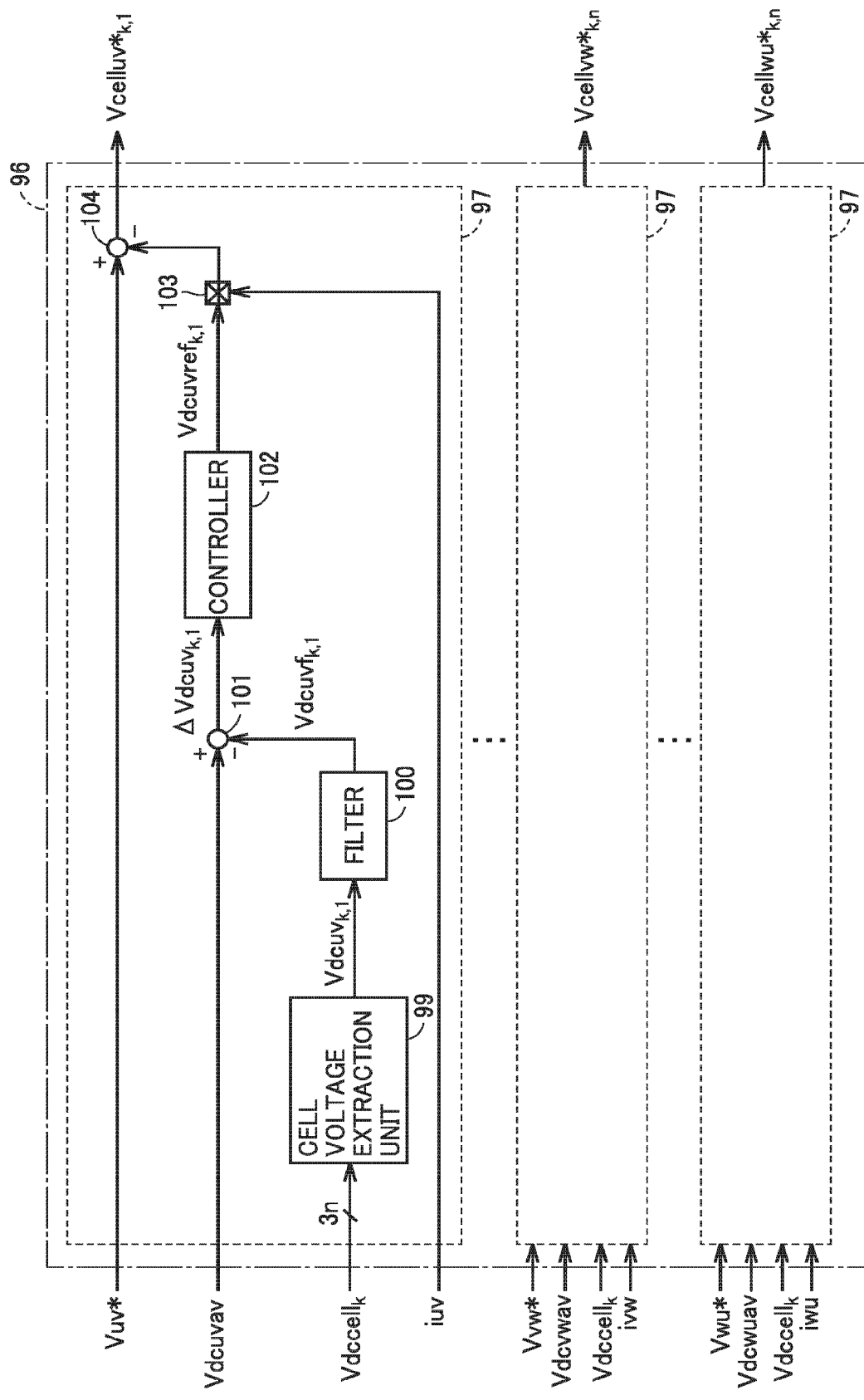
FIG. 13 is a diagram showing a configuration example of a cell DC voltage control unit in FIG. 12.

FIG. 13 is a diagram showing a configuration example of cell DC voltage control unit 96 in FIG. 12. Referring to FIG. 13, cell DC voltage control unit 96 includes 3×n cell control units 97 corresponding to the total number of cells controlled by control device $Cc_k$. Each of 3×n cell control units 97 is configured to generate cell voltage command value Vcell* in corresponding cell 5. Since 3×n cell control units 97 have the same configuration, cell control unit 97 corresponding to cell 5 in the first stage of cell set $Su_k$ in arm A1 will be representatively hereinafter described. Cell control unit 97 includes a cell voltage extraction unit 99, a filter 100, subtractors 101 and 104, a controller 102, and a multiplier 103.

Cell voltage extraction unit 99 extracts capacitor voltage Vdccell$_k$ in corresponding cell 5 from 3×n capacitor voltages Vdccell$_k$. In the following description, capacitor voltage Vdccell$_k$ of cell 5 in the first stage of cell set Su$_k$ in arm A1 will also be referred to as a "capacitor voltage Vdcuv$_{k,1}$".

Filter 100 removes the AC component of a frequency $2f$ from capacitor voltage Vdcuv$_{k,1}$ extracted by cell voltage extraction unit 99 to thereby compute a voltage Vdcuvf$_{k,1}$. Subtractor 101 obtains a deviation ΔVdcuv$_{k,1}$ between U-V phase voltage representative value Vdcuvav and voltage Vdcuvf$_{k,1}$.

Controller 102 executes a control computation for setting deviation ΔVdcuv$_{k,1}$ at zero to thereby compute an operation amount Vdcuvref$_{k,1}$. Multiplier 103 multiplies operation amount Vdcuvref$_{k,1}$ by arm current iuv in phase with this operation amount.

Subtractor 104 subtracts the output of multiplier 103 from arm voltage command value Vuv* in phase with the above-mentioned operation amount to thereby generate a cell voltage command value Vcelluv*$_{k,1}$. Cell voltage command value Vcelluv*$_{k,1}$ corresponds to cell voltage command value Vcell* for cell 5 in the first stage of cell set Su$_k$.

In cell DC voltage control unit 96, n cell voltage command values Vcelluv*$_{k,1}$ to Vcelluv*$_{k,n}$ are generated corresponding to n cells 5 included in cell set Su$_k$ in arm A1; n cell voltage command values Vcellvw*$_{k,1}$ to Vcellvw*$_{k,n}$ are generated corresponding to n cells 5 included in cell set Sv$_k$ in arm A2; and n cell voltage command values Vcellwu*$_{k,1}$ to Vcellwu*$_{k,n}$ are generated corresponding to n cells 5 included in cell set Sw$_k$ in arm A3. In this way, 3×n cell voltage command values Vcell* are generated corresponding to 3×n cells.

In view of the above, the power conversion device according to the first embodiment can facilitate an increased capacity.

Second Embodiment

The first embodiment has been described with regard to a configuration including a plurality of control devices, in which each control device transmits voltages of a plurality of cells controlled by the control device to the other control devices. The second embodiment will be described with regard to a configuration including a plurality of control devices, in which each control device transmits a representative value of voltages in a plurality of cells controlled by the control device to the other control devices.

Figure 14:
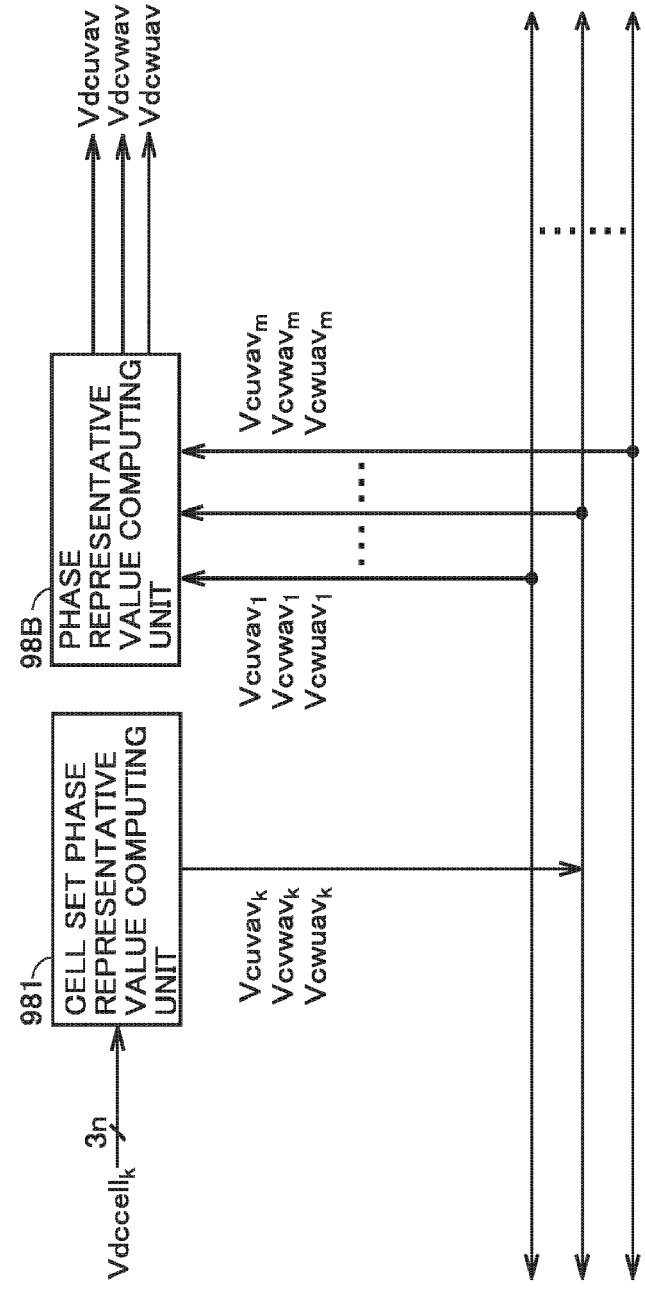
FIG. 14 is a diagram showing inputs and outputs of a phase representative value computing unit in a power conversion device according to the second embodiment.

FIG. 14 is a diagram showing inputs and outputs of a phase representative value computing unit 98B in a power conversion device according to the second embodiment. In the configuration shown in FIG. 14, phase representative value computing unit 98 in FIG. 6 is replaced with 98B, and a cell set phase representative value computing unit 981 is added. Since the configurations other than the above are the same, the description thereof will not be repeated.

Referring to FIG. 14, cell set phase representative value computing unit 981 receives 3×n capacitor voltages Vdccell$_k$, and calculates a cell set phase representative value Vcuvav$_k$ of n capacitor voltages Vdccell$_k$ by computation processing (for example, addition processing or comparison processing) for n capacitor voltages Vdccell$_k$ included in cell set Su$_k$. Cell set phase representative value computing unit 981 calculates a cell set phase representative value Vcvwav$_k$ of n capacitor voltages Vdccell$_k$ by computation processing for n capacitor voltages Vdccell$_k$ included in cell set Sv$_k$. Cell set phase representative value computing unit 981 calculates a cell set phase representative value Vcwuav$_k$ of n capacitor voltages Vdccell$_k$ included in cell set Sw$_k$. Cell set phase representative value computing unit 981 transmits cell set phase representative values Vcuvav$_k$, Vcvwav$_k$, and Vcwuav$_k$ (specific information) to each of the control devices other than control device Cc$_k$. Cell set phase representative values Vcuvav$_k$, Vcvwav$_k$, and Vcwuav$_k$ may be the average value, the maximum value, and the minimum value in n cells 5 included in each of cell sets Su$_k$, Sv$_k$, and Sw$_k$.

From each control device other than control device Cc$_k$, phase representative value computing unit 98B receives cell set phase representative values Vcuvav, Vcvwav, and Vcwuav (specific information) in the cell set controlled by the control device. Phase representative value computing unit 98B calculates U-V phase voltage representative value Vdcuvav by computation processing (for example, addition processing or comparison processing) for m cell set phase representative values Vcuvav of cell sets Su$_1$ to Su$_m$. Phase representative value computing unit 98B calculates V-W phase voltage representative value Vdcvwav by computation processing for m cell set phase representative values Vcvwav of cell sets Sv$_1$ to Sv$_m$. Phase representative value computing unit 98B calculates W-U phase voltage representative value Vdcwuav by computation processing for m cell set phase representative values Vcwuav of cell sets Sw$_1$ to Sw$_m$.

The types of cell set phase representative values Vcuvav$_k$, Vcvwav$_k$, and Vcwuav$_k$ are the same as the types of U-V phase voltage representative value Vdcuvav, V-W phase voltage representative value Vdcvwav, and W-U phase voltage representative value Vdcwuav. For example, when each of cell set phase representative values Vcuvav$_k$, Vcvwav$_k$, and Vcwuav$_k$ is an average value, each of U-V phase voltage representative value Vdcuvav, V-W phase voltage representative value Vdcvwav, and W-U phase voltage representative value Vdcwuav is also an average value.

In the power conversion device according to the second embodiment, the number of pieces of data transmitted from one control device to another control device is three cell set phase representative values. On the other hand, in the first embodiment, the number of pieces of data transmitted from one control device to another control device is a voltage value of 3×n cells 5. According to the power conversion device in the second embodiment, the amount of data transmitted from one control device to another control device can be reduced to about 1/n of that in the case of the power conversion device according to the first embodiment, and therefore, the amount of communication occurring among a plurality of control devices in controlling the power conversion device can be reduced as compared with the case of the power conversion device according to the first embodiment.

In the power conversion device according to the second embodiment, one control device performs computation processing of m cell set phase representative values for each of arms A1 to A3. On the other hand, in the power conversion device according to the first embodiment, a plurality of control devices perform computation processing of m×n pieces of data for each of arms A1 to A3. According to the power conversion device in the second embodiment, the amount of computation performed in one control device can be reduced to about 1/n of that in the case of the power conversion device according to the first embodiment, and therefore, the amount of computation performed by each of the plurality of control devices in controlling the power conversion device can be reduced as compared with the case of the power conversion device according to the first embodiment.

In view of the above, the power conversion device according to the second embodiment can facilitate an increased capacity, and also, can reduce the amount of communication and the amount of computation required for controlling the power conversion device as compared with the case of the power conversion device according to the first embodiment.

Third Embodiment

The second embodiment has been described with regard to the configuration including a plurality of control devices, in which each control device transmits a representative value of voltages of a plurality of cells controlled by the control device to the other control devices. The third embodiment will be described with regard to a configuration including a plurality of control devices, in which each control device calculates a representative value of voltage values in a plurality of unit converters included in one arm based on: data received from two control devices adjacent to the control device among the control devices connected in series; and a representative value of voltages of a plurality of unit converters included in a cell set controlled by the control device.

Figure 15:
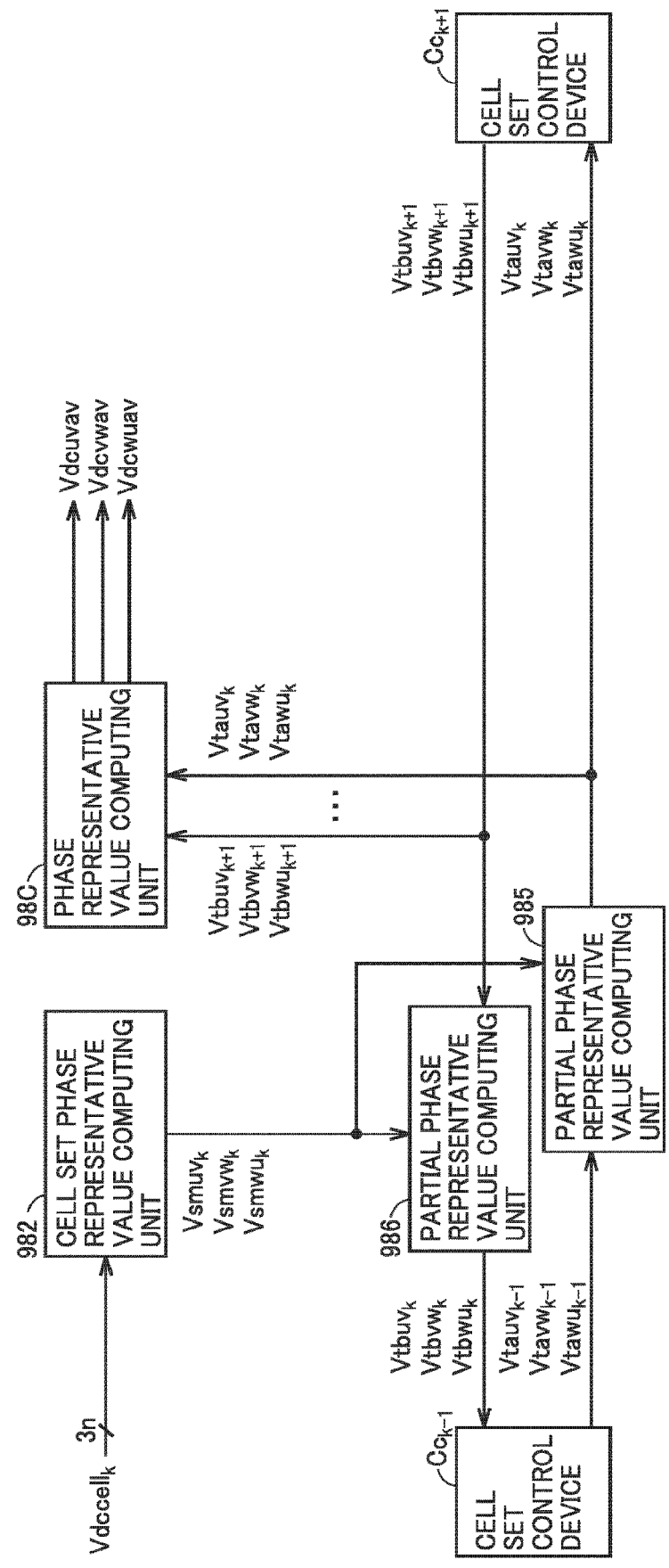
FIG. 15 is a diagram showing inputs and outputs of a phase representative value computing unit in a power conversion device according to the third embodiment.

FIG. 15 is a diagram showing inputs and outputs of a phase representative value computing unit 98C in a power conversion device according to the third embodiment. In the configuration shown in FIG. 15, phase representative value computing unit 98B and cell set phase representative value computing unit 981 in FIG. 14 are replaced with a phase representative value computing unit 98C and a cell set phase representative value computing unit 982, respectively, and also, partial phase representative value computing units 985 and 986 are added. Since the configurations other than the above are the same, the description thereof will not be repeated.

Referring to FIG. 15, cell set phase representative value computing unit 982 receives 3×n capacitor voltages Vdccell$_k$ and calculates a cell set phase representative value Vsmuv$_k$ by computation processing for capacitor voltages Vdccell$_k$ of n cells 5 included in cell set Su$_k$. Cell set phase representative value computing unit 982 calculates a cell set phase representative value Vsmvw$_k$ by computation processing for capacitor voltages Vdccell$_k$ of n cells 5 included in cell set Sv$_k$. Cell set phase representative value computing unit 982 calculates a cell set phase representative value Vsmwu$_k$ by computation processing for capacitor voltages Vdccell$_k$ of n cells 5 included in cell set Sw$_k$.

From a control device Cc$_{k-1}$, partial phase representative value computing unit 985 receives a phase representative value Vtauv$_{k-1}$ (the first phase representative value) of capacitor voltages Vdccells in (k−1) n cells 5 included in cell sets Su$_1$ to Su$_{k-1}$. From control device Cc$_{k-1}$, partial phase representative value computing unit 985 receives a phase representative value Vtavw$_{k-1}$ (the first phase representative value) of capacitor voltages Vdccell in (k−1) n cells 5 included in cell sets Sv$_1$ to Sv$_{k-1}$. From control device Cc$_{k-1}$, partial phase representative value computing unit 985 receives a phase representative value Vtawu$_{k-1}$ (the first phase representative value) of capacitor voltages Vdccell in (k−1) n cells 5 included in cell sets Sw$_1$ to Sw$_{k-1}$.

Partial phase representative value computing unit 985 calculates a phase representative value Vtauv$_k$ from phase representative value Vtauv$_{k-1}$ and cell set phase representative value Vsmuv$_k$. Partial phase representative value computing unit 985 calculates a phase representative value Vtavw$_k$ from phase representative value Vtavw$_{k-1}$ and cell set phase representative value Vsmvw$_k$. Partial phase representative value computing unit 985 calculates a phase representative value Vtawu$_k$ from phase representative value Vtawu$_{k-1}$ and cell set phase representative value Vsmwu$_k$. Partial phase representative value computing unit 985 transmits phase representative values Vtauv$_k$, Vtavw$_k$, and Vtawu$_k$ (specific information) to a control device Cc$_{k+1}$.

From control device Cc$_{k+1}$, partial phase representative value computing unit 986 receives a representative value Vtbuv$_{k+1}$ (the second phase representative value) of capacitor voltages Vdccell of (m-k) n cells 5 included in cell sets Su$_{k+1}$ to Su$_m$. From control device Cc$_{k+1}$, partial phase representative value computing unit 986 receives a representative value Vtbvw$_{k+1}$ (the second phase representative value) of capacitor voltages Vdccell of (m-k) n cells 5 included in cell sets Sv$_k$+1 to Sv$_m$. From control device Cc$_{k+1}$, partial phase representative value computing unit 986 receives a representative value Vtbwu$_{k+1}$ (the second phase representative value) of capacitor voltages Vdccell in (m-k) n cells 5 included in cell sets Sw$_{k-1}$ to Sw$_m$.

Partial phase representative value computing unit 986 calculates a phase representative value Vtbuv$_k$ from phase representative value Vtbuv$_{k-1}$ and cell set phase representative value Vsmuv$_k$. Partial phase representative value computing unit 986 calculates a phase representative value Vtbvw$_k$ from phase representative value Vtbvw$_k$+1 and cell set phase representative value Vsmvw$_k$. Partial phase representative value computing unit 986 calculates a phase representative value Vtbwu$_k$ from phase representative value Vtbwu$_k$−1 and cell set phase representative value Vsmwu$_k$. Partial phase representative value computing unit 986 transmits phase representative values Vtbuv$_k$, Vtbvw$_k$, and Vtbwu$_k$ (specific information) to control device Cc$_{k-1}$.

Based on phase representative values Vtauv$_k$ and Vtbuv$_{k+1}$, phase representative value computing unit 98C calculates U-V phase voltage representative value Vdcuvav that is a value representing the voltage values of m×n cells 5 included in arm A1. Based on phase representative values Vtavw$_k$ and Vtbvw$_{k+1}$, phase representative value computing unit 98C calculates V-W phase voltage representative value Vdcvwav that is a value representing the voltage values of m×n cells 5 included in arm A2. Based on phase representative values Vtawu$_k$ and Vtbwu$_{k+1}$, phase representative value computing unit 98C calculates W-U phase voltage representative value Vdcwuav that is a value representing the voltage values of m×n cells 5 included in arm A3.

In the power conversion device according to the third embodiment, the number of pieces of data received by one control device is six phase representative values. On the other hand, in the second embodiment, the number of pieces of data received by one control device is 3(m−1) cell set phase representative values. According to the power conversion device in the third embodiment, the amount of data transmitted from one control device can be set substantially constant irrespective of the number m of cell sets. Thus, the amount of communication occurring among a plurality of control devices in controlling the power conversion device can be reduced as compared with the case of the power conversion device according to the second embodiment.

Also, in the power conversion device according to the third embodiment, one control device performs computation processing of two representative values in order to calculate a phase representative value in each of arms A1 to A3. On the other hand, in the power conversion device according to the second embodiment, when the phase representative value in each of arms A1 to A3 is an average value, one control device needs to perform computation processing of m pieces of data in order to calculate this average value. According to the power conversion device in the third embodiment, the amount of computation performed in one control device can be set substantially constant irrespective of the number m of cell sets. Thus, the amount of computation performed by each of the plurality of control devices in controlling the power conversion device can be reduced as compared with the case of the power conversion device according to the second embodiment.

In view of the above, the power conversion device according to the third embodiment can facilitate an increased capacity, and also, can reduce the amount of communication and the amount of computation required for controlling the power conversion device as compared with the case of the power conversion device according to the second embodiment.

With regard to the first to third embodiments as described above, it has been originally intended at the time of filing of the present application to appropriately combine the configurations described in the embodiments, including any combination not mentioned in the specification, within a range free of inconsistency or contradiction.

It should be understood that the embodiments disclosed herein are illustrative and non-restrictive in every respect. The scope of the present disclosure is defined by the terms of the claims, rather than the description above, and is intended to include any modifications within the meaning and scope equivalent to the terms of the claims.

REFERENCE SIGNS LIST 1 power system, 1$u$ to 1$w$ power transmission line, 2 MMC, 4 transformer, 5 cell, 5$a$, 5$b$ output terminal, 6, 8 voltage detector, 7 capacitor, 9 driver, 10 full voltage control unit, 11 representative value computing unit, 98, 98B, 98C phase representative value computing unit, 12, 22 to 24, 32 to 34, 52 to 54, 58, 59, 68, 69, 83, 101, 104 subtractor, 13, 25, 70, 84, 102 controller, 20 interphase balance control unit, 21 voltage computing unit, 26 to 28, 103 multiplier, 29, 30, 31 proportional unit, 35, 40 to 42, 51, 63, 64, 66, 67, 81, 82, 93 to 95 adder, 985, 986 partial phase representative value computing unit, 37, 38, 39 integrator, 50 reverse-phase current command computing unit, 55, 62, 65, 92 coordinate conversion unit 56, 57, 100 filter, 60 output current control unit, 61 reference voltage computing unit, 80 circulating current control unit, 90 voltage command value computing unit, 91 phase voltage command value computing unit, 96 cell DC voltage control unit, 97 cell control unit, 99 cell voltage extraction unit, 140 gate signal generation unit, 200 power conversion device, 981, 982 cell set phase representative value computing unit, A1 to A3 arm, C1 to C3, Cu to Cw current detector, Cc$_1$ to Cc$_m$ control device, D1 to D4 diode, L1 to L3 reactor, NL negative electrode line, PL positive electrode line, Q1 to Q4 switching element, Su$_1$ to Su$_m$, Sv$_1$ to Sv$_m$, Sw$_1$ to Sw$_m$ cell set, UL, VL, WL AC line.

The invention claimed is:

1. A power conversion device interconnected to a three-phase AC power supply, the power conversion device comprising:

a power converter including a first arm, a second arm, and a third arm that are connected by a delta connection, wherein each of the first arm to the third arm includes a first cell set to an m-th cell set that are connected in series (where m is an integer equal to or greater than 2), the power conversion device further comprises a first control device to an m-th control device that are capable of communicating with each other and that each control a corresponding one of the first cell set to the m-th cell set, each of the first cell set to the m-th cell set includes a plurality of unit converters connected in series, each of the first control device to the m-th control device generates: a voltage command value used for controlling a current flowing between the three-phase AC power supply and the power converter; and a zero-phase voltage command value used for controlling a circulating current flowing through the delta connection, and generates an arm voltage command value for each of the first arm to the third arm based on the voltage command value and the zero-phase voltage command value, a k-th control device (where k is an integer equal to or greater than 1 and equal to or less than m) included in the first control device to the m-th control device transmits specific information to control devices other than the k-th control device among the first control device to the m-th control device, the specific information including voltage values of the unit converters included in a k-th cell set in each of the first arm to the third arm, the k-th control device receives specific information from each control device other than the k-th control device among the first control device to the m-th control device, the specific information including the voltage values of the unit converters included in a cell set controlled by the each control device other than the k-th control device, for each of the first arm to the third arm, the k-th control device calculates a phase representative value of the voltage values of the unit converters included in each of the first arm to the third arm, and generates a cell voltage command value of each of the unit converters included in the k-th cell set in each of the first arm to the third arm, using the arm voltage command value and the phase representative value for each of the first arm to the third arm, and the k-th control device outputs a control signal to a unit converter corresponding to the cell voltage command value, the control signal being used for controlling the unit converter according to the cell voltage command value.

2. The power conversion device according to claim 1, wherein each of the unit converters includes a power storage element connected between a pair of output terminals, and a plurality of switching elements that each generate an output pulse depending on a voltage value of the power storage element between the pair of output terminals, and a voltage value of each of the unit converters is the voltage value of the power storage element.

3. The power conversion device according to claim 1, wherein the specific information including the voltage values of the unit converters included in the k-th cell set in each of the first arm to the third arm is a cell set phase representative value of the voltage values of the unit converters included in the k-th cell set in each of the first arm to the third arm.

4. The power conversion device according to claim 3, wherein
the first cell set to the m-th cell set are connected in series in an order of the first cell set to the m-th cell set,
each of the first control device to the m-th control device calculates the cell set phase representative value of the voltage values of the unit converters included in a cell set in each of the first arm to the third arm, each of the cell sets being controlled by a corresponding one of the first control device to the m-th control device,
the integer k is equal to or greater than 2 and equal to or less than (m−1),
the k-th control device receives a first phase representative value of cell set phase representative values calculated by the first control device to the (k−1)-th control device from the (k−1)-th control device, and transmits a value representing the cell set phase representative value calculated by the k-th control device and the first phase representative value to the (k+1)-th control device,
the k-th control device receives a second phase representative value of cell set phase representative values calculated by the (k+1)-th control device to the m-th control device from the (k+1)-th control device, and transmits a value representing the cell set phase representative value calculated by the k-th control device and the second phase representative value to the (k−1)-th control device, and
the k-th control device calculates the phase representative value in each of the first arm to the third arm based on the first phase representative value, the cell set phase representative value calculated by the k-th control device, and the second phase representative value.

* * * * *

UNITED STATES PATENT AND TRADEMARK OFFICE
CERTIFICATE OF CORRECTION

| | |
|---|---|
| PATENT NO. | : 11,949,322 B2 |
| APPLICATION NO. | : 17/769429 |
| DATED | : April 2, 2024 |
| INVENTOR(S) | : Kenichi Kondo et al. |

It is certified that error appears in the above-identified patent and that said Letters Patent is hereby corrected as shown below:

On the Title Page

Item (72) should read:
-- (72) Inventors: Kenichi Kondo, Chuo-ku (JP); Ryota Okuyama, Chuo-ku (JP); Takashi Sugiyama, Chuo-ku (JP) --

Signed and Sealed this
Twenty-eighth Day of May, 2024

Katherine Kelly Vidal
*Director of the United States Patent and Trademark Office*